(12) United States Patent
Ballinger

(10) Patent No.: US 8,764,461 B2
(45) Date of Patent: Jul. 1, 2014

(54) SYSTEM FOR ELECTRICALLY CONNECTING CONDUCTOR TO TRACK MEMBER

(75) Inventor: Forrest H. Ballinger, Grain Valley, MO (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 13/637,266

(22) PCT Filed: Feb. 28, 2011

(86) PCT No.: PCT/US2011/026398
§ 371 (c)(1),
(2), (4) Date: Sep. 25, 2012

(87) PCT Pub. No.: WO2011/119291
PCT Pub. Date: Sep. 29, 2011

(65) Prior Publication Data
US 2013/0017737 A1 Jan. 17, 2013

Related U.S. Application Data

(60) Provisional application No. 61/317,415, filed on Mar. 25, 2010.

(51) Int. Cl.
*H01R 4/66* (2006.01)
(52) U.S. Cl.
USPC .......................................................... 439/94
(58) Field of Classification Search
USPC ........................................... 439/94, 803, 805
See application file for complete search history.

(56) References Cited

U.S. PATENT DOCUMENTS

| | | | |
|---|---|---|---|
| 2,109,791 A | 3/1938 | Carlson | |
| 4,925,395 A | 5/1990 | Franks, Jr. | |
| 5,362,253 A | 11/1994 | Lin et al. | |
| 5,746,609 A * | 5/1998 | Franks, Jr. | 439/92 |

(Continued)

FOREIGN PATENT DOCUMENTS

| | | |
|---|---|---|
| DE | 2757790 A1 | 6/1979 |
| EP | 2108848 A1 | 10/2009 |
| FR | 1185985 A | 8/1959 |

OTHER PUBLICATIONS

International Search Report and Written Opinion dated May 31, 2011 which was issued in connection with the PCT Patent Application No. US11/26398 which was filed on Feb. 28, 2011.

*Primary Examiner* — Phuong Dinh
(74) *Attorney, Agent, or Firm* — GE Global Patent Operation; John A. Kramer

(57) ABSTRACT

A system for electrically connecting a conductor to a track member includes a clamp base, a clamp bolt, and a wire bolt. The clamp base receives part of the track member, and has a threaded throughbore. The clamp bolt includes a spike pin and a body that is threaded for screwing into the clamp base. The body defines a threaded recess. The wire bolt has a longitudinal throughbore, and is threaded for screwing into the recess. When the conductor is positioned through the wire bolt and the wire bolt is screwed into the recess, the wire bolt holds the conductor in place in electrical engagement with the clamp bolt. When the track member part is received in the clamp base and the clamp bolt is screwed through the clamp base, the spike pin bites into the track member for establishing an electrical connection and clamping the clamp base in place.

15 Claims, 6 Drawing Sheets

(56) References Cited

U.S. PATENT DOCUMENTS

| | | |
|---|---|---|
| 6,329,592 B1 | 12/2001 | Auclair |
| 7,543,372 B2 | 6/2009 | Reichle |
| 7,988,646 B2 * | 8/2011 | Taber .......................... 600/585 |
| 8,096,816 B2 * | 1/2012 | Kossak et al. .................. 439/92 |
| 2006/0032934 A1 | 2/2006 | Reichle |

* cited by examiner

SYSTEM FOR ELECTRICALLY CONNECTING CONDUCTOR TO TRACK MEMBER

CROSS REFERENCE TO RELATED APPLICATIONS

This application is a National Stage of International Application No. PCT/US11/26398, filed Feb. 28, 2011, which claims the benefit of U.S. Provisional Application Ser. No. 61/317,415, filed on Mar. 25, 2010, both of which are herein incorporated by reference in their entireties.

FIELD OF THE INVENTION

Embodiments of the invention relate generally to electrical conductors and more particularly to systems for connecting an electrical conductor to a track member.

BACKGROUND OF THE INVENTION

It is sometimes desired in the rail industry to connect an electrical conductor (e.g., a wire or cable) to a section of railroad track or other conductive guideway over which a rail vehicle travels (referred to generally herein as a "track member"). This might be for purposes of electrically connecting two track members together, or for electrically connecting a track member to a wayside device, such as a track circuit device that transmits and/or receives electrical signals over the track member.

In one method for connecting a conductor to a track member, a hole is drilled through the track member for introducing the conductor. This method, however, is time consuming, requires special equipment, and may be detrimental to track member integrity. Other methods involve using an adhesive or welding to bond a conductor to a track member. These methods, however, require special equipment, specially trained personnel, special preparation of the attachment site, and the resulting bonds are subject to environmental degradation over time.

BRIEF DESCRIPTION OF THE INVENTION

An embodiment of the present invention relates to a connection system for electrically connecting a wire, cable, or other conductor to an electrically conductive track member. The connection system includes a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. Also, the body defines a threaded recess extending partway into the clamp bolt. The wire bolt is threaded for screwing into the threaded recess of the clamp bolt. The wire bolt defines a longitudinal throughbore for accommodating the wire, cable, or other conductor.

When the wire, cable, or other conductor is positioned through the wire bolt throughbore and the wire bolt is screwed into the threaded recess of the clamp bolt, the wire bolt holds an electrically conductive end portion of the wire, cable, or other conductor in place in electrical engagement with a wall of the clamp bolt recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

According to another embodiment of the present invention, a connection system for electrically connecting a wire, cable or other conductor to an electrically conductive track member includes a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. The clamp base also includes one or more threaded blind recesses. At least one wire bolt is threaded for screwing into one of the threaded blind recess of the clamp bolt. The wire bolt defines a longitudinal throughbore for accommodating the wire, cable, or other conductor.

When the wire, cable, or other conductor is positioned through the wire bolt throughbore and the wire bolt is screwed into the blind recess of the clamp base, the wire bolt holds an electrically conductive end portion of the wire, cable, or other conductor in place in electrical engagement with an interior wall of the clamp base recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

Another embodiment of the present invention relates to a connection system for electrically connecting a wire, cable, or other conductor to an electrically conductive track member. The connection system includes a clamp base, a clamp bolt, and a wire bolt. At least part of the clamp bolt is electrically conductive, and the clamp bolt includes a body and a first spike pin attached to a distal end of the body. At least part of the body is threaded for screwing into the throughbore of the clamp base. Also, the body defines a threaded recess extending partway into the clamp bolt. The wire bolt is threaded for screwing into the threaded recess of the clamp bolt. The wire bolt defines a longitudinal throughbore for accommodating the wire, cable, or other conductor.

When the wire, cable, or other conductor is positioned through the wire bolt throughbore and the wire bolt is screwed into the threaded recess of the clamp bolt, the wire bolt holds an electrically conductive end portion of the wire, cable, or other conductor in place in electrical engagement with a wall of the clamp bolt recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

Another embodiment of the present invention relates to a connection system installation for electrically connecting a wire, cable, or other conductor to an electrically conductive track member. The connection system installation includes an electrically conductive track member, a clamp base having a throughbore, a clamp bolt, a threaded wire bolt and a wire cable or other conductor. At least part of the clamp bolt is electrically conductive, and the clamp bolt includes a body and a first spike pin attached to a distal end of the body for biting into the track member. At least part of the body is threaded for screwing into the throughbore of the clamp base. Also, the body defines a threaded recess extending partway into the clamp bolt. The wire bolt screwed into the threaded recess of the clamp bolt. The wire bolt defines a longitudinal throughbore for accommodating the wire, cable, or other conductor. When the wire, cable or other conductor is positioned in the wire bolt throughbore the wire bolt holds an electrically conductive end portion of the wire, cable, or other conductor in place.

Another embodiment of the present invention relates to a connection system for electrically connecting a wire, cable, or other conductor to an electrically conductive track member. The connection system includes a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. Also, one of the clamp base and the body defines a blind threaded recess extending partway into the clamp base or clamp bolt. The wire bolt is threaded for screwing into the blind threaded recess of the clamp base or the clamp bolt. The wire bolt defines a longitudinal throughbore for accommodating the wire, cable, or other conductor.

When the wire, cable, or other conductor is positioned through the wire bolt throughbore and the wire bolt is screwed into the blind threaded recess of the clamp base or the clamp bolt, the wire bolt holds an electrically conductive end portion of the wire, cable, or other conductor in place in electrical engagement with a wall of the blind threaded recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

Yet another embodiment of the present invention relates to a connection system for electrically connecting a wire, cable, or other conductor to an electrically conductive track member. The connection system includes a clamp base, a clamp bolt, and a wire bolt. The clamp base receives part of an electrically conductive track member, and has a threaded throughbore extending through the clamp base. Also, the clamp base has at least one blind threaded recess extending partway into the clamp base. At least part of the clamp bolt is electrically conductive, and the clamp bolt includes a body and a first spike pin attached to a distal end of the body. At least part of the body is threaded for screwing into the throughbore of the clamp base. The wire bolt is threaded for screwing into the blind threaded recess of the clamp base. The wire bolt defines a longitudinal throughbore for accommodating the wire, cable, or other conductor.

When the wire, cable, or other conductor is positioned through the wire bolt throughbore and the wire bolt is screwed into the blind threaded recess of the clamp base, the wire bolt holds an electrically conductive end portion of the wire, cable, or other conductor in place in electrical engagement with a wall of the blind threaded recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
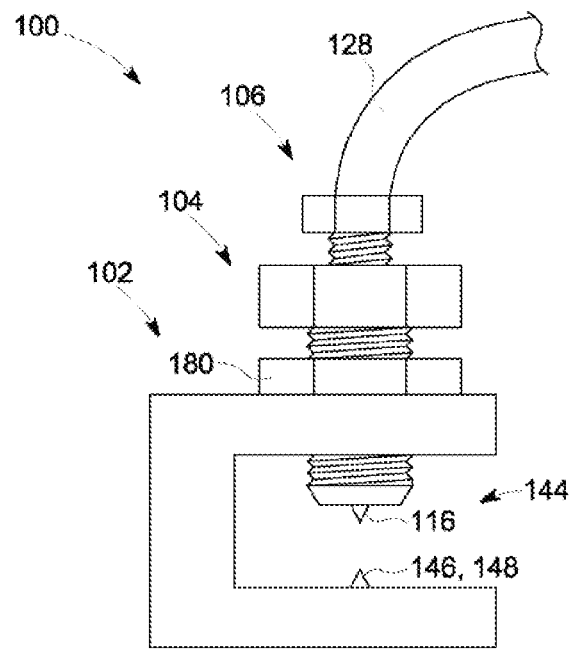
FIG. 1 is a schematic side elevation view of a connection system according to an embodiment of the present invention.
Figure 2:
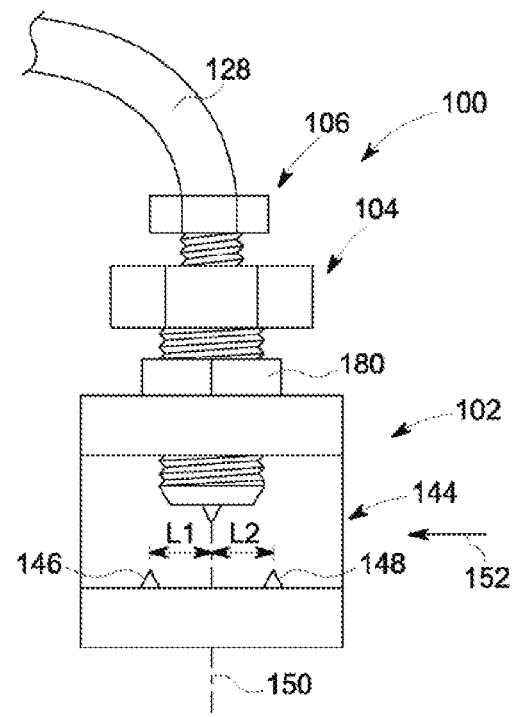
FIG. 2 is a schematic front elevation view of the connection system.
Figure 3:
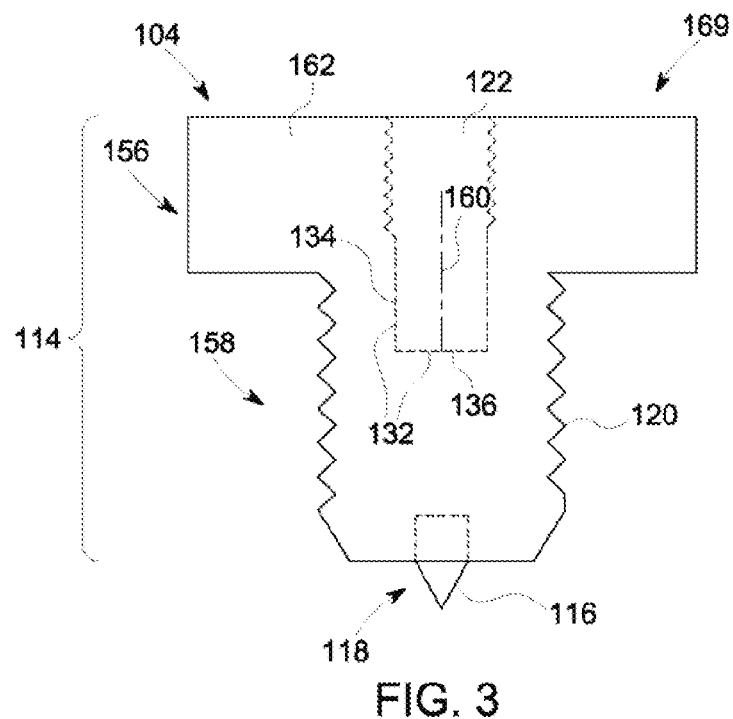
FIG. 3 is a side elevation cross section view of a clamp bolt portion of the connection system, according to an embodiment of the present invention.

Reference will be made below in detail to exemplary embodiments of the invention, examples of which are illustrated in the accompanying drawings.

Wherever possible, the same reference numerals used throughout the drawings refer to the same or like parts. Although exemplary embodiments of the present invention are described with respect to railroad tracks, embodiments of the invention are also applicable for use with track members generally, meaning any electrically conductive guideway for a vehicle.

Embodiments of the invention relate to a connection system for electrically connecting a wire, cable, or other conductor to an electrically conductive track member. The connection system includes a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. In an embodiment, the threaded portion of the body and the threaded throughbore of the clamp base have fine pitch threads. Also, the body defines a threaded recess extending partway into the clamp bolt. The wire bolt is threaded for screwing into the threaded recess of the clamp bolt. The wire bolt defines a longitudinal throughbore for accommodating the conductor.

When the conductor is positioned through the wire bolt throughbore and the wire bolt is screwed into the threaded recess of the clamp bolt, the wire bolt holds an electrically conductive end portion of the conductor in place in electrical engagement with a wall of the clamp bolt recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member.

FIGS. 1-6 show various embodiments of a connection system 100. The connection system 100 includes a clamp base 102, a clamp bolt 104, and a wire bolt 106. The clamp base 102 is configured for receiving a part 108 of an electrically conductive track member 110. The clamp base 102 has a threaded throughbore 112 extending through the clamp base 102. The clamp bolt 104 has a clamp bolt body 114 and a first spike pin 116 attached to a distal end 118 of the body 114. At least part of the body 114 is provided with threads 120 for screwing the clamp bolt 104 into the throughbore 112 of the clamp base 102. The clamp bolt body 114 defines a threaded recess 122 extending partway into the clamp bolt 104. The wire bolt 106 is provided with threads 124 for screwing the wire bolt 106 into the threaded recess 122 of the clamp bolt 104. The wire bolt 106 defines a longitudinal throughbore 126 for accommodating a conductor 128. When the conductor 128 is positioned through the wire bolt throughbore 126 and the wire bolt 106 is screwed into the threaded recess 122 of the clamp bolt 104, the wire bolt 106 holds an electrically conductive end portion 130 of the conductor 128 in place in electrical engagement with a wall 132 (side wall 134 and/or bottom wall 136) of the clamp bolt recess 122. When the track member part 108 is received in the clamp base 102 and the clamp bolt 104 is screwed into the threaded throughbore 112 of the clamp base 102, the first spike pin 116 bites into the track member part 108 for creating an electrical connection between the track member 110 and the clamp bolt 104 and clamping the clamp base 102 in place against the track member 110. Since the conductor 128 is in electrical connection with the clamp bolt, this also establishes an electrical connection between the conductor 128 and the track member 110.

Notably, the first spike pin 116 has a controlled maximum depth of penetration based on how far the spike pin 116 extends from the base of clamp bolt 104, once clamp bolt 104 is fully tightened. In particular, the maximum depth of penetration is limited to the extent that the spike pin 116 protrudes from the flat distal end 118 of the clamp bolt 104. This feature prevents excessive dimpling of the track member 110 and/or other damage to the track. More specifically, in an embodiment, when the clamp base 102 is put in place for receiving the part 108 of the track member 110, and with the clamp bolt 104 put in place through the throughbore 112 of the clamp base, the distal end 118 of the clamp bolt 104 presents a flat surface to the top surface of the part 108; that is, the distal end includes the spike pin and a flat surface, surrounding the spike pin, that lies parallel to the top surface of the part 108. (See FIGS. 5 and 12, for example.) When the clamp bolt 104 is tightened into place, the flat surface of the distal end 118 limits the depth to which the spike pin 116 can be driven into the part 108, regardless of the amount of force that is applied to the clamp bolt. This eliminates the need to use a torque wrench to properly install the unit.

Advantageously, embodiments of the connection system 100 require no track member preparation (such as drilling holes or preparing an area for adhesive use), require no special tools for electrically connecting the conductor to the track member, and allow for connection of a conductor to a track member base. In another aspect, the conductor is electrically connected to the track member by way of a gas tight compression connection.

FIGS. 1, 2, 5, and 6 show embodiments of the clamp base 102. In one embodiment, the clamp base 102 is a generally U-shaped member (in lateral cross section—see FIGS. 1, 5, and 6) having an upper clamp portion 138, a lower clamp portion 140, and a cross-member 142 connecting the upper clamp portion to the lower clamp portion. The upper clamp portion 138, lower clamp portion 140, and cross-member 142 together define a channel-like opening 144, i.e., the clamp base 102 is open at one side and two ends. The upper clamp portion 138 and lower clamp portion 140 lie generally opposed to one another across the opening 144. The opening is configured (e.g., shaped) to receive part 108 of a track member 110, that is, the opening is configured so that the track member part 108 can be inserted into the opening 144 with the track member part 108 lying disposed between the upper clamp portion 138 and the lower clamp portion 140. The track member part 108 may be, for example, one side of a base of a railroad track rail/member. The throughbore 112 extends through the upper clamp portion 138, and is internally threaded. In an embodiment, when the lower clamp portion 140 is placed against a flat surface, the throughbore 112 is oriented perpendicular to the slope of the top of rail base 108.

In an embodiment, the clamp base 102 additionally includes at least two spike pins, specifically, at least a second spike pin 146 and a third spike pin 148. The clamp base may include additional spike pins. The second and third spike pins 146, 148 are attached to the lower clamp portion 140 of the clamp base 102. The second and third spike pins 146, 148 extend towards the upper clamp portion 138. The second and third spike pins 146, 148 are each laterally offset by a distance L1, L2, respectively, from a center axis 150 of the threaded throughbore 112 of the clamp base 102 that extends through the upper clamp portion 138. In an embodiment, L1 is equal to L2. In another embodiment, L1 is different from L2. In an embodiment, the second and third spike pins 146, 148 are laterally offset in a direction parallel to a longitudinal axis 152 of the clamp base 102. In another embodiment, the second and third spike pins 146, 148 are laterally offset in a direction perpendicular to the axis 152. The second and third spike pins 146, 148 (and other spike pins if provided) facilitate clamping of the clamp base 102 to the track member 110 by biting into, or at least firmly engaging, the track member when the clamp bolt 104 is tightly screwed into place. That is, tightly screwing the clamp bolt 104 into the throughbore 112 causes the clamp bolt to press against the track member and the track member to in turn press against the second and third spike pins 146, 148. Providing at least the two spike pins 146, 148 in a laterally offset arrangement facilitates securing clamping, since the track member 110 is supported by the spike pins and cannot bend or twist upon the clamp bolt 104 being tightened into place. In particular, the two lower spike pins 146, 148 provide torsional stability and prevent the clamp assembly 100 from vibrating of the track member 110.

In an embodiment, one or more of the first, second, and third spike pins 116, 146, 148 are made of tungsten or a metal alloy comprising tungsten, e.g., a heavy metal tungsten alloy such as high speed steel, or metal alloy containing tungsten and one or more of nickel, copper, and iron, or just hardened steel. (Such alloys are very hard, allowing for the spike pin(s) to penetrate most other metals.) In another embodiment, all the spike pins are made of tungsten or a metal alloy comprising tungsten. In another embodiment, only the clamp bolt spike pin 116 is made of tungsten or a metal alloy comprising tungsten. Each spike pin may comprise a body member (e.g., square or cylindrical) for securing the spike pin to an underlying structure (e.g., clamp bolt body 114 or lower clamp base portion 140) and a pointed portion, attached to the spike pin body member, that engages the track member. Additionally, instead of tungsten or a tungsten alloy, one or more of the spike pins may be made from another material, such as hardened steel.

In an embodiment, the clamp bolt body 114 of the clamp bolt 104 has an upper body portion 156 and a lower body portion 158. At least part of the lower body portion is provided with external threads 120. The lower body portion 158 may be at least generally cylindrical. The lower body portion 158 defines the distal end 118 of the clamp bolt 104. The first spike pin 116 is attached to the distal end 118. In an embodiment, the first spike pin 116 is coaxial with a longitudinal axis 160 of the clamp bolt 104. The upper body portion 156 may comprise a clamp bolt head 162, which may be a hex head (6-sided head), for example. The lower body portion 158 is configured for secure engagement with the throughbore 112 of the clamp base 102. "Secure engagement" means that the threads 120 of the clamp bolt 104 match the internal threads of the throughbore 112 of the clamp base 102, so that when the clamp bolt is screwed into place through the throughbore 112, it is held tightly in place without substantial gaps, "wiggling," or other looseness. The clamp bolt body 114 defines the recess 122. The recess 122 extends partway into the clamp bolt 104. For example, the recess 122 may start at a second distal end 169 of the clamp bolt 104 and extend partway through the upper body portion 156, or all the way through the upper body portion 156 but terminating at the lower body portion 158, or all the way through the upper body portion 156 and extending partway into the lower body portion 158. In an embodiment, "partway" or "blind" means not extending entirely through. In another embodiment, "partway" or "blind" is intended to include situations in which the recess is not completely "blind" or closed-ended, but where the recess defines a bottom shoulder or land (e.g., a "stepped" bore or recess) for securely receiving a conductor there-against when the wire bolt is threaded in place, as discussed below. In any event, "partway" or "blind" includes both completely closed-off recesses and recesses that are stepped (i.e., recesses that have a bottom shoulder or land). The recess 122 may be at least generally cylindrical, and may be coaxial with the axis 160. The recess is bound by interior walls 132 of the clamp bolt 104, which may include one or more side walls 134 (such as a cylindrical side wall) and a bottom side wall 136 (such as a round bottom side wall). The recess 122 is at least partly internally threaded, meaning at least the top area of the recess, proximate the second distal end 169, is provided with internal threads.

The entirety of the clamp bolt 104 may be electrically conductive, for example, if the body 114 is made of a conductive metal such as steel. Alternatively, only part of the clamp bolt may be electrically conductive, such as the part extending from the bottom end of the recess 122 (where the end portion 130 of the conductor 128 touches the clamp bolt) to the distal end 118 and/or spike pin 116.

In an embodiment, the wire bolt 106 has a wire bolt body 166 that is provided with external threads 124 for secure engagement with the threaded recess 122 of the clamp bolt 104. The body 166 defines the longitudinal throughbore 126 for accommodating the conductor 128. When the conductor 128 is positioned through the wire bolt throughbore 126 with the electrically conductive end portion 130 of the conductor 128 bent around a distal end 168 of the wire bolt 106, and the wire bolt 106 is screwed into the threaded recess 122 of the clamp bolt 104, the distal end 168 of the wire bolt 106 places the end portion 130 of the conductor 128 into engagement with a side wall 132 (e.g., bottom side wall 136) of the clamp bolt recess 122. This establishes an electrical connection between the conductor 128 and the clamp bolt 104, and facilitates holding the conductor 128 in place. Because of the secure threaded connection between the wire bolt 106 and clamp bolt 104, this is a gas tight compression connection, assuming the end portion 130 is bent around the distal end 168 for being sandwiched between the wire bolt 106 and clamp bolt 104.

Figure 6:
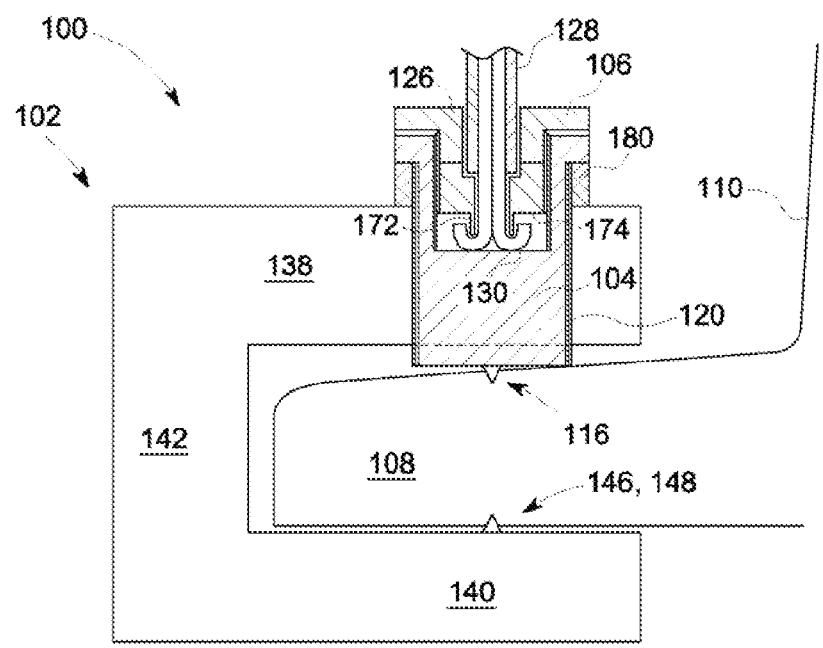
FIG. 6 is a schematic side elevation cross section view (not in scale) of a connection system installation according to an embodiment of the present invention.

In an embodiment, the wire bolt 106 further comprises a head 170 attached to a first end of the wire bolt body 166 and/or an extension 172 attached to a second end of the wire bolt body 166. The head 170 may be a hex head. The extension 172 defines the distal end 168 of the wire bolt 106. The extension 172 has a diameter D1 smaller than a diameter D2 of the wire bolt body 166 for establishing a lateral clearance 174 between a side wall 176 of the extension 172 and a side wall 134 of the clamp bolt recess 122 when the wire bolt body 166 is screwed into the clamp bolt recess 122. As shown in FIG. 6, the clearance 174 accommodates the end portion 130 of the conductor 128 bent around the distal end of the wire bolt.

In an embodiment, a lower edge 178 of the extension 172 (see FIG. 4), which defines the distal end 168 of the wire bolt, is rounded to assure clamping of the wire strands at the bottom of the clamp bolt recess.

Figure 4:
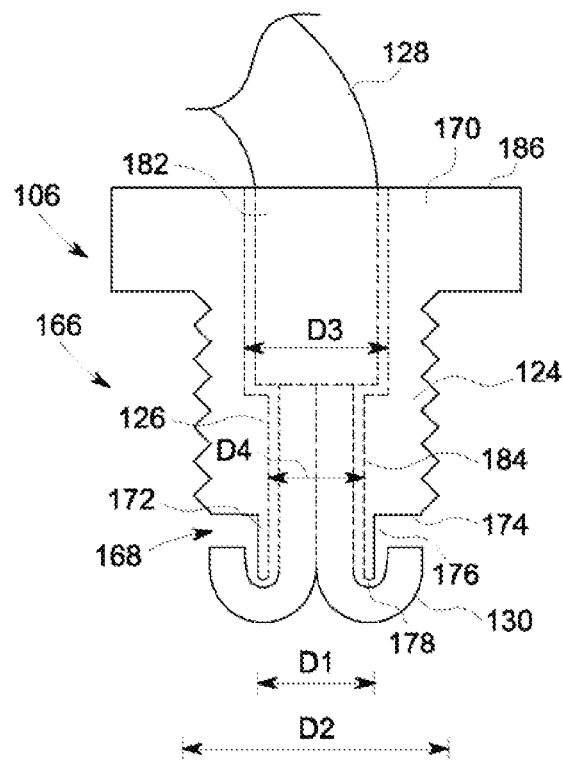
FIG. 4 is a side elevation cross section view of a wire bolt portion of the connection system, according to an embodiment of the present invention.
Figure 5:
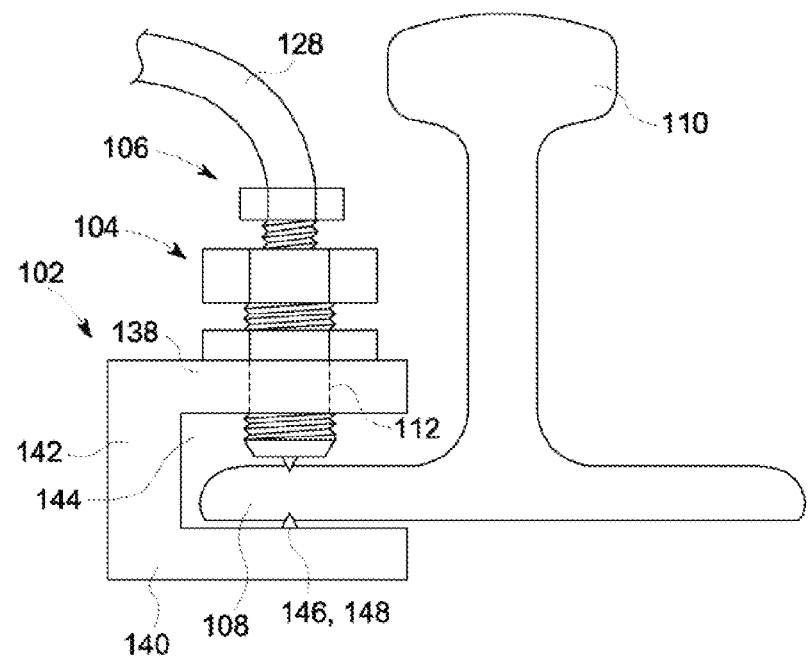
FIG. 5 is a schematic side elevation view of a connection system installation, according to an embodiment of the present invention.

In an embodiment, the longitudinal throughbore 126 of the wire bolt 106 includes an insulation clearance portion 182 and a wire hole portion 184. The insulation clearance portion 182 extends from a second end 186 of the wire bolt 106 partway through the wire bolt. The wire hole portion 184 extends from the distal end 168 of the wire bolt 106 partway through the wire bolt, to meet up with the insulation clearance portion 182, the insulation clearance portion 182 and the wire hole portion 184 thereby being integral and in fluid connection. The insulation clearance portion 182 and the wire hole portion 184 may be coaxial. The insulation clearance portion 182 has a diameter D3 that is larger than a diameter D4 of the wire hole portion 184. As shown in FIG. 4, the insulation clearance portion 182 accommodates the entire lateral extent of the conductor 128, e.g., the lateral extent defined by the geometry of the conductor including internal wires and an external insulator, whereas the wire hole portion 184 accommodates only part of the conductor 128, e.g., the internal wires only. Thus, the wire bolt may be dimensioned based on a desired size and type of conductor 128 to be electrically connected to a track member 110. (Typically, the conductor will be of a designated gauge and type for a particular application.)

In an embodiment, the connection system 100 further comprises a lock nut 180 having internal threads that match the external threads 120 of the clamp bolt 104. The lock nut 180 is deployed between the clamp bolt head 162 and the upper clamp portion 138 of the clamp base 102. Thus, the clamp bolt 104 is first screwed into the lock nut 180, and then the clamp bolt 104 is screwed into the throughbore 112 of the clamp base 102. The lock nut 180 helps to maintain the clamp bolt in place (e.g., it acts against vibration movement of the clamp bolt 104). Although all the figures show a lock nut 180, the lock nut is an optional component.

The clamp base, clamp bolt, wire bolt, and/or other parts of the connection system 100 may each be made wholly or partially out of steel. Alternatively, the clamp base, clamp bolt, wire bolt, and/or other parts of the connection system 100 may each be made out of other metals, or other high durability materials such as certain polymers. Any of the parts may be wholly or partly galvanized or otherwise protected from the environment by other suitable coatings known in the art. In an embodiment, at least external surfaces of the parts, which are exposed when the connection system is deployed in operation (e.g., the wire bolt is tightly screwed into the clamp bolt and the clamp bolt, with the wire bolt screwed therein, is tightly screwed into the clamp base), are galvanized. "Tightly" screwed means screwed as far as possible up to a maximum recommended torque for the materials and parts in question.

In operation of an embodiment, for assembly of the connection system 100 into a connection system installation (FIGS. 5 and 6), an end of the conductor 128 is stripped of insulation. The length of the stripped portion depends on the configuration of the wire bolt 106, such as the length of all or a portion of the wire bolt throughbore 126 and the length of the extension 172, if an extension is provided. For example, if the wire bolt 106 includes an insulation clearance portion 182, a wire hole portion 184, and an extension 172, the stripped portion would be (i) at least as long as the wire hole portion 184 plus enough extra for the conductor 128 to extend around the distal end 168, but (ii) typically no longer than the wire hole portion 184 plus the length of the extension 172, so that the conductor end portion 130 can fit within the clearance 174. (Of course, it would be possible in some instances to wrap the conductor end portion 130 around the side wall 176 of the extension 172, so limit "ii" is not a definite constraint.) The conductor 128 is then passed into the wire bolt throughbore 126 from the second end 186, stripped portion (and end portion 130) first. If the stripped portion is sized properly, the end portion 130 should stick out past the distal end 168. Then, the end portion 130 is bent around the distal end 168, as shown in FIG. 4.

Next, the conductor and wire bolt assembly are moved into alignment with the clamp bolt (or vice versa), and the wire bolt is screwed into the clamp bolt recess 122 until tight. The wire bolt and clamp bolt recess are complementarily sized so that when the wire bolt is fully screwed into the clamp bolt, but without a conductor in place within the wire bolt, the distal end of the wire bolt lies against or close to the bottom side wall of the recess. With a conductor in place, and with the conductor end portion 130 bent around the distal end of the wire bolt, however, instead of the wire bolt being screwed in to its maximum possible depth, the wire bolt compresses the conductor end portion 130 against the clamp bolt, creating an electrical connection between the conductor and clamp bolt and holding the conductor in place.

Subsequently, or previously, the designated part 108 of the track member 110 is received in the opening 144 of the clamp base. This may be done by moving the track member 110 into the opening 144, or by moving the clamp base 102 around the part 108 so that the part 108 extends into the opening. If the track member 110 is in place against a support surface (e.g., railroad ties), the clamp base 102 will typically be deployed at a spot along the track member between adjacent ties (i.e., in such cases the base of the track member will be exposed and accessible).

The conductor, wire bolt, and clamp bolt assembly are then screwed into the throughbore 112 of the clamp base 102, optionally through a lock nut 180. The clamp bolt is tightened into place through the clamp base, initially causing the lower clamp portion 140 to move towards the track member 110, causing the spike pins 146, 148 of the clamp base to bite into the track member 110 (or at least engage the track member), and causing the clamp bolt spike pin 116 to bite into the track member 110 and create an electromechanical connection between the clamp bolt and track member. Thus, tightening the clamp bolt into place (i) clamps the clamp base against the track member 110, and (ii) because there is an electrical connection between the conductor and the clamp bolt, creates an electrical connection between the conductor and track member. It is expected that the connection system is suitable for establishing a permanent electrical connection between the conductor and track member, but one that can also be easily removed, if needed, using standard tools and without damage to the connection system or track member.

Embodiments of the invention relate to a connection system installation, meaning the connection system as installed in combination with a track member. The connection system installation includes an electrically conductive track member, a clamp base, a clamp bolt, a wire bolt, and a conductor. The clamp base receives part of the track member, and has a threaded throughbore extending through the clamp base. The clamp bolt has an at least partially threaded body, and at least part of the clamp bolt is electrically conductive. The clamp bolt lies screwed into the throughbore of the clamp base. The clamp bolt body defines a threaded recess extending partway into the clamp bolt. The clamp bolt further comprises a first spike pin attached to a distal end of the body and biting into the track member part. The threaded wire bolt defines a longitudinal throughbore, and lies screwed into the recess of the clamp bolt. The conductor is positioned in the wire bolt throughbore, with the wire bolt holding an electrically conductive end portion of the conductor in place in electrical engagement with a wall of the clamp bolt recess.

In another embodiment, a connection system installation comprises an electrically conductive railroad track member, a clamp base, a clamp bolt, a wire bolt, and a conductor. The railroad track member is positioned on a support surface for guiding a rail vehicle along a route. The clamp base defines an opening, with part of the track member being positioned within the opening and disposed between an upper clamp portion of the clamp base and a lower clamp portion of the clamp base. The clamp base defines an internally threaded throughbore extending through the upper clamp portion. The clamp bolt is electrically conductive, and has an upper body portion and an externally threaded lower body portion connected to the upper body portion. The clamp bolt is tightly screwed into the throughbore of the clamp base. The upper body portion defines an internally threaded recess extending partway into the clamp bolt. The clamp bolt further comprises a first spike pin attached to a distal end of the lower body portion, which bites into the track member part. The clamp bolt clamps the clamp base in place against the track member, with there being an electrical connection between the track member part and the clamp bolt. The wire bolt has a wire bolt body that is externally threaded and tightly screwed into the threaded recess of the clamp bolt. The wire bolt defines a longitudinal throughbore. The conductor is positioned in the wire bolt throughbore, with an electrically conductive end portion of the conductor bent around a distal end of the wire bolt. The end portion of the conductor is securely sandwiched between the distal end of the wire bolt and a bottom of the clamp bolt recess, for establishing an electrical connection between the conductor and the clamp bolt, and for holding the conductor in place.

Figure 7:
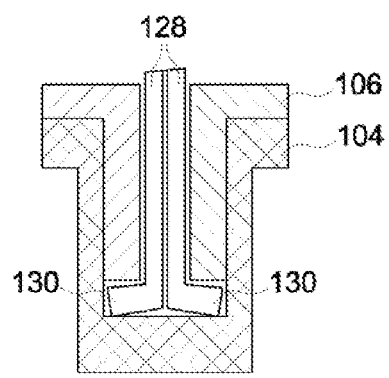
FIG. 7 is a schematic side elevation cross section view of an alternative embodiment of a wire bolt.

FIG. 7 shows an alternative embodiment of a wire bolt. Here, the wire bolt does not include an extension 172. Instead, conductor wires are bent around the distal end, and lie between the distal end and the clamp bolt when the wire bolt is screwed into place.

In an alternative embodiment, no spike pins are provided, with the electromechanical connection between the clamp bolt and track member being created by the distal end 118 of the clamp bolt. (In such a case, the surface of the track member may be prepared, such a roughing or other removal of surface oxide or contaminants, for facilitating an electrical contact.) In another embodiment, the distal end 118 of the clamp bolt may have ridges (e.g., a ridged surface) or an otherwise textured/rough surface for creating a reliable electromechanical connection with the track member. In another embodiment, the spike pins are integral with the clamp bolt and/or clamp base, i.e., the spike pins are formed as part of the clamp bolt and/or clamp base. In another embodiment, the spike pin 116 comprises the distal end 118 of the clamp bolt being pointed. In another embodiment, the distal end 118 of the clamp bolt includes plural spike points, such as a raised diamond pattern grid, for scoring the track member when the clamp bolt is screwed into place. In yet another embodiment, the spike pin 116 can instead be formed as an inverted cone to prevent substantial dimpling of the track member, and which has a maximum depth of penetration limited to how far the inverted cone protrudes from the distal end 118 of the clamp bolt 104. In another embodiment, the spike pin 116 may be rounded instead of pointed to also prevent substantial dimpling of the track member 110.

In another embodiment, the clamp base includes two (or more) threaded throughbores, and the connection system comprises plural clamp bolt and wire bolt pairs, for attaching plural conductors to a track member. In another embodiment, additionally or alternatively, the connection system includes supplemental clamping members for further clamping the clamp base to a track member. Such supplemental clamping members could be, for example, like the clamp bolt (and with the clamp base provided with another throughbore for receiving the clamp bolt) but without a threaded recess and matching wire bolt.

Figure 8:
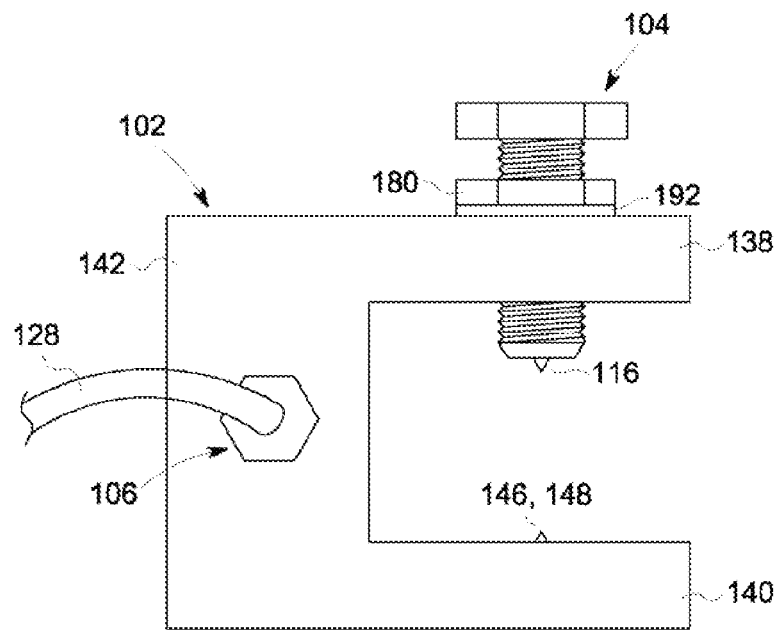
FIG. 8 is a schematic side elevation view of a connection system showing the wire bolt in communication with the base according to an embodiment of the present invention.
Figure 9:
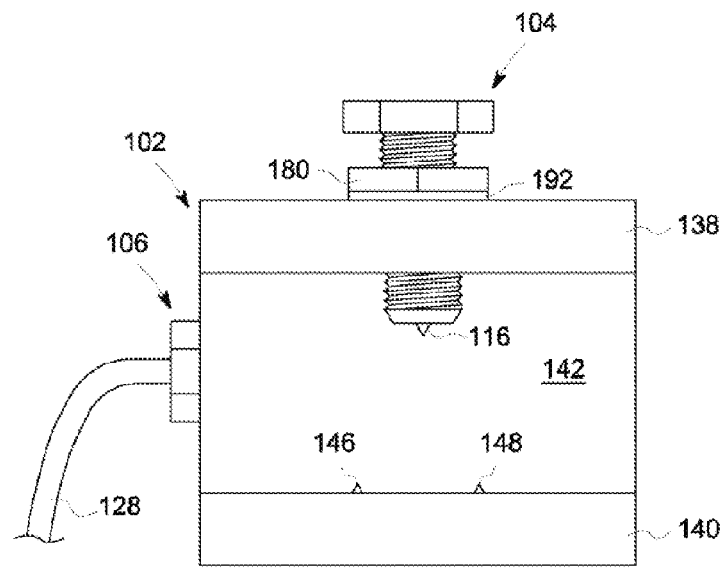
FIG. 9 is a schematic front elevation view of the connection system of FIG. 8.
Figure 10:
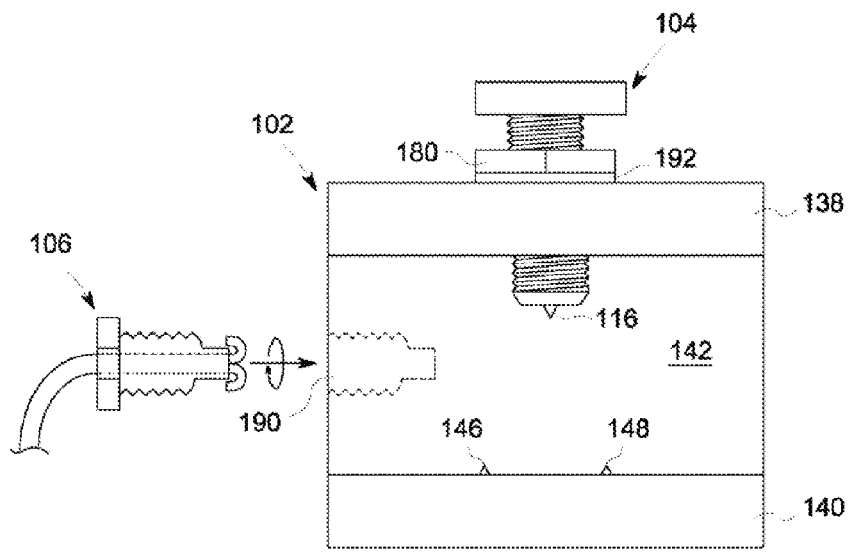
FIG. 10 is a schematic front elevation view of the connection system of FIG. 8 showing the wire bolt separate from the base.

FIGS. 8-10 show another embodiment, where the wire bolt 106 and clamp bolt 104 are functionally separated. Here, instead of the wire bolt 106 screwing into the clamp bolt 104, the wire bolt 106 screws into a clamp base recess 190 provided for this purpose, where the clamp base recess 190 is similar to the recess 122 explained above, but extends into the clamp base 102 instead of the clamp bolt 104. The clamp base recess 190 is a blind bore, i.e., it does not extend all the way through the base. The system is still outfitted with a clamp bolt 104, but for purposes of clamping the clamp base 104 to the track member 110 and not for purposes of mechanically connecting a conductor 128. In this embodiment, the wire bolt 106 establishes an electromechanical connection between the conductor 128 and the clamp base 102 (by placing the conductor end portion 130 in contact with an interior wall of the clamp base recess 190), and an electrical connection is established between the clamp base 102 and the track member 110 via the clamp bolt 104, spike pins, the clamp base abutting the track member, etc. Such embodiments may be beneficial for effectuating different orientations of the conductor (as explained below), and/or it may be easier (or more mechanically robust) to first connect the conductor and wire bolt to the clamp base and then clamp the clamp base to the track member using the clamp bolt (or vice versa).

The clamp base recess 190 may be vertically oriented in the upper clamp portion 138, or it may extend horizontally (or another orientation) into the cross-member 142 as shown in FIG. 8-10, into the end of the upper clamp portion 138, or into the lower clamp portion 140. A horizontal orientation (or other non-vertical orientation) may facilitate easier connection of the conductor to the track member. It should also be noted that a clamp base recess (for receiving a wire bolt) could be oriented in different ways, such as extending horizontally out away from the track member (i.e., the clamp base recess being oriented perpendicular to an axis of the track), or extending horizontally along the track member (i.e., the clamp base recess being orientated parallel to an axis of the track).

For a system with separate clamp and wire bolts, each may be held in place using a respective lock nut disposed between the wire bolt head 170 and the clamp base 102.

Figure 11:
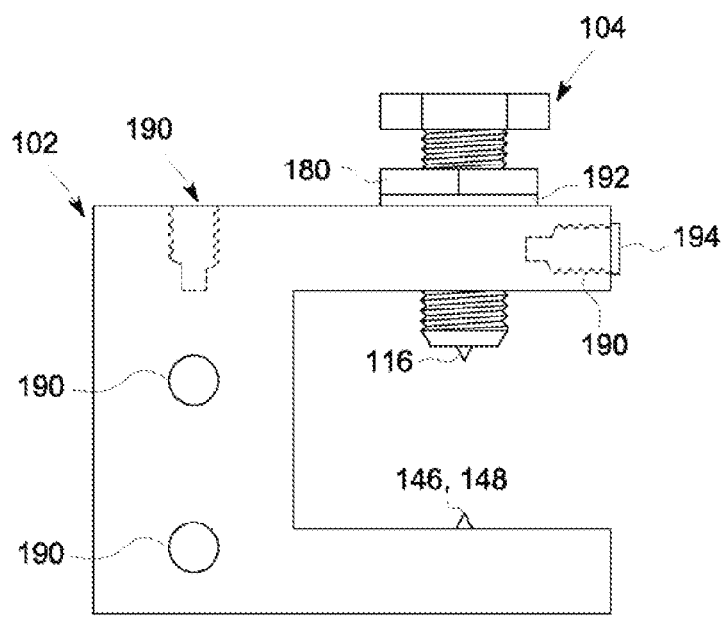
FIG. 11 is a schematic side elevation view of a connection system of a connection system according to an embodiment of the present invention.

In another embodiment, the clamp base includes plural threaded recesses, oriented horizontally in an array or otherwise, or the clamp base includes plural threaded recesses some of which are oriented horizontal and some vertical (or at other orientations), for enabling plural conductors to be connected to the clamp base using respective plural wire bolts. An example of this embodiment is shown in FIG. 11. As shown therein, the clamp base 102 is provided with a plurality of threaded clamp base recesses 190, as discussed above. These recesses may be vertically oriented and extend into the upper clamp portion 138, horizontally oriented and extend into the upper clamp portion 138, horizontally oriented and extend into the cross member 142, or extend into the lower clamp portion 140. The clamp base recesses 190 can be positioned at almost any location on the clamp base 102 and in almost any orientation such that the respective wire bolts 106 establish an electromechanical connection between the respective conductors 128 and the clamp base 102 (by placing the respective conductor end portions 130 in contact with an interior wall of the respective clamp base recesses 190). In connection with this embodiment, the clamp bolt 104 can also have a clamp bolt recess 122, as discussed above in connection with the embodiments in FIGS. 1-6, to accommodate yet another wire bolt 106 for facilitating the electromechanical connection between yet another conductor and the clamp base.

In another embodiment, the clamp base 102 may be lengthened, or otherwise provided with a greater surface area by increasing the clamp base dimensions in any direction, to allow space for additional clamp bolts and/or clamp base recesses to accommodate as many wire bolts, and thus as many electrical connections, as desired.

For a system with separate clamp and wire bolts, or a system with a plurality of clamp base recesses 190, each recess 190 includes a removable plug 194. The plug 194 may be removed to access the clamp base recess 190 so that a wire bolt 106 and conductor 128 may be inserted and thereadedly engaged therein. If a clamp base recess 190 is not in use, the plug 194 can be left in place to prevent the threads of the recess 190 from becoming fouled with dirt, debris or the like. The plugs 194 also shield the recesses 194 from water to prevent corrosion such that a secure and reliable electromechanical connection is possible between a wire bolt (and conductor) and the clamp base, when desired.

In an embodiment, the connection system 100 further comprises a gripping mechanism to help maintain the clamp bolt in place. The gripping mechanism may be a split lock washer 192 that is deployed between the clamp bolt head 162 and the upper clamp portion 138 of the clamp base 102, or between the lock nut 180 and the upper clamp portion 138 of the clamp base 102 if the lock nut 180 is used. The split lock washer 192 helps to maintain the clamp bolt 104 in place. Although FIGS. 8-11 show a split lock washer 192, the split lock washer 192 is an optional component. In addition, while only shown in FIGS. 8-11, the split lock washer 192 can nonetheless be employed in any of the embodiments within the scope of the invention. Alternatively, in an embodiment, the gripping mechanism may be integrally formed with the clamp bolt head 162, with the lock nut 180 or with the upper clamp portion 138 of the clamp base 102. In this embodiment, the gripping mechanism on the clamp bolt head 162, lock nut 180 and/or upper clamp portion 138 may take the form of a rough surface texture, such as ridges and grooves, to help maintain the clamp bolt in place.

In another embodiment a disruptive thread device (not shown) may be inserted into the clamp bolt recess 122 and/or clamp base recess 190. A disruptive thread device is a cylindrical coil made of metal or other material known in the art. After the disruptive thread device is inserted into the clamp bolt recess or the clamp base recess, the wire bolt is then screwed into the same recess for holding an electrically conductive end portion of the conductor in place in electrical engagement with a wall of the clamp bolt recess or the clamp base recess. In this configuration, the disruptive thread device acts as an internal lock to help secure and maintain the wire bolt within its corresponding clamp bolt recess or clamp base recess.

In yet another embodiment, a waterproof, electrolytic grease and/or silicone may be used within the clamp bolt recess and/or clamp base recess, as well as on the threaded portion of the wire bolt, to facilitate insertion of the wire bolt into the corresponding clamp bolt/clamp base recess, as well as to prevent any corrosion or other weathering of the threads.

Figure 12:
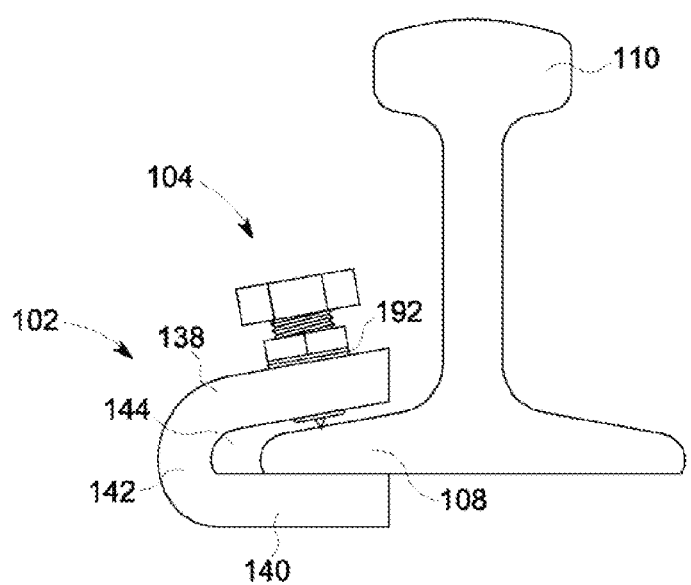
FIG. 12 is a schematic side elevation view of a connection system according to an embodiment of the presented invention.

As disclosed in detail above, the clamp base 102 is generally U-shaped (in lateral cross section) and defines a channel-like opening 144. In particular, as hereinbefore disclosed, the clamp base is configured (e.g., shaped) to receive part 108 of a track member 110, that is, the opening 144 is configured so that the track member part 108 can be inserted into the opening. In certain instances, however, track member part 108 of the track member 110 may be sloped or angled. As shown in FIG. 12, in such instances, the clamp base 102 may be formed so that the opening 144 closely conforms to, or matches, the shape (including the slope/angle) of the top of the rail base/track member part 108. As shown therein, such a configuration of the clamp base 102 ensures that the throughbore 112, and thus the clamp bolt 104 itself, is oriented perpendicular to the slope of the top of the rail base. As will be readily appreciated, this clamp base configuration may be utilized in connection with any of the embodiments described above. Note that in FIG. 12, pins 146 and 148 are not shown, for simplicity of illustration, but in an embodiment, would be included with the device shown in FIG. 12 and as described herein.

An embodiment of the present invention relates to a connection system for electrically connecting a wire, cable, or other conductor to an electrically conductive track member. The connection system may include a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. Also, the body defines a threaded recess extending partway into the clamp bolt. The wire bolt is threaded for screwing into the threaded recess of the clamp bolt. The wire bolt defines a longitudinal throughbore for accommodating the wire, cable, or other conductor. When the wire, cable, or other conductor is positioned through the wire bolt throughbore and the wire bolt is screwed into the threaded recess of the clamp bolt, the wire bolt holds an electrically conductive end portion of the wire, cable, or other conductor in place in electrical engagement with a wall of the clamp bolt recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member. The wire bolt may further include a head attached to a first end of the wire bolt body and an extension attached to a second end of the wire bolt body, the extension defining the distal end of the wire bolt, wherein the extension has a diameter smaller than a diameter of the wire bolt body for establishing a lateral clearance between a side wall of the extension and a side wall of the clamp bolt recess when the wire bolt body is in secure engagement with the clamp bolt recess, the clearance for accommodating the end portion of the wire, cable, or other conductor bent around the distal end of the wire bolt. The connection system may further include a lock nut having internal threads that match the externally threaded clamp bolt lower body portion, wherein when the clamp bolt is screwed into first the lock nut and then the threaded throughbore of the clamp base and tightened into place, with the lock nut positioned between the clamp bolt head and the upper clamp portion of the clamp base, the lock nut helps to maintain the clamp bolt in place. The connection system may include at least second and third spike pins attached to the lower clamp portion of the clamp base and extending towards the upper clamp portion, the second and third spike pins each being laterally offset from a center axis of the internally threaded throughbore of the clamp base that extends through the upper clamp portion. The first, second, and third spike pins may be made of tungsten, a metal alloy comprising tungsten, or hardened steel. The external surfaces of the clamp base, clamp bolt, and wire bolt may be galvanized to inhibit weathering and the like.

Another embodiment of the present invention relates to a connection system installation. The connection system installation may include an electrically conductive railroad track member positioned on a support surface for guiding a rail vehicle along a route and a clamp base defining an opening, wherein part of the track member is positioned within the opening and disposed between an upper clamp portion of the clamp base and a lower clamp portion of the clamp base, and wherein the clamp base defines an internally threaded throughbore extending through the upper clamp portion. The installation may further include an electrically conductive clamp bolt having an upper body portion and an externally threaded lower body portion connected to the upper body portion, wherein the clamp bolt is tightly screwed into the throughbore of the clamp base, and wherein the upper body portion defines an internally threaded recess extending partway into the clamp bolt, and wherein the clamp bolt further comprises a first spike pin attached to a distal end of the lower body portion, the first spike pin biting into the track member part and the clamp bolt clamping the clamp base in place against the track member, and there being an electrical connection between the track member part and the clamp bolt. The installation may include a wire bolt having a wire bolt body that is externally threaded and tightly screwed into the threaded recess of the clamp bolt, wherein the wire bolt defines a longitudinal throughbore, and a wire, cable, or other conductor positioned in the wire bolt throughbore with an electrically conductive end portion of the wire, cable, or other conductor bent around a distal end of the wire bolt, wherein the end portion of the wire, cable, or other conductor is securely sandwiched between the distal end of the wire bolt and a bottom of the clamp bolt recess, for establishing an electrical connection between the wire, cable, or other conductor and the clamp bolt, and for holding the wire, cable, or other conductor in place. The wire bolt may include a head attached to a first end of the wire bolt body and an extension attached to a second end of the wire bolt body, wherein the extension defines the distal end of the wire bolt. The extension may have a diameter smaller than a diameter of the wire bolt body for establishing a lateral clearance between a side wall of the extension and a side wall of the clamp bolt recess, wherein the end portion of the wire, cable, or other conductor, which is bent around the distal end of the wire bolt, is accommodated within the clearance. The installation may further include a lock nut having internal threads that match the externally threaded clamp bolt lower body portion. The lock nut may be positioned between the clamp bolt head and the upper clamp portion of the clamp base for helping to maintain the clamp bolt in place, with the clamp bolt lower body portion extending through the lock nut. The connection system installation may further be provided with at least second and third spike pins attached to the lower clamp portion of the clamp base and extending towards the upper clamp portion. The second and third spike pins may each be laterally offset from a center axis of the internally threaded throughbore of the clamp base that extends through the upper clamp portion. These spike pins may bite into a bottom of the track member part to help maintain the clamp base in place. The first, second, and third spike pins may be formed from tungsten, a metal alloy comprising tungsten, or hardened steel. At least external, exposed surfaces of the clamp base, clamp bolt, and wire bolt may have a protective coating.

Another embodiment of the present invention relates to a connection system for electrically connecting a wire, cable, or other conductor to an electrically conductive track member. The connection system may include a clamp base, a clamp bolt, and a wire bolt. At least part of the clamp bolt may be electrically conductive, and the clamp bolt may include a body and a first spike pin attached to a distal end of the body. At least part of the body may be threaded for screwing into the throughbore of the clamp base. Also, the body may define a threaded recess extending partway into the clamp bolt. The wire bolt may be threaded for screwing into the threaded recess of the clamp bolt. The wire bolt defines a longitudinal throughbore for accommodating the wire, cable, or other conductor. When the wire, cable, or other conductor is positioned through the wire bolt throughbore and the wire bolt is screwed into the threaded recess of the clamp bolt, the wire bolt holds an electrically conductive end portion of the wire, cable, or other conductor in place in electrical engagement with a wall of the clamp bolt recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member. The connection system may further include a lock nut engaging the clamp bolt for helping to maintain the clamp bolt in place when the clamp bolt is screwed into the throughbore of the clamp base. The system may also include at least second and third spike pins attached to the clamp base and biting into the track member part to clamp the clamp base in place against the track member. The first second and third spike pins may be made of tungsten, a metal alloy comprising tungsten, or hardened steel.

Another embodiment of the present invention relates to a connection system installation for electrically connecting a wire, cable, or other conductor to an electrically conductive track member. The connection system installation may include an electrically conductive track member, a clamp base having a throughbore, a clamp bolt, a threaded wire bolt and a wire cable or other conductor. At least part of the clamp bolt may be electrically conductive, and the clamp bolt may include a body and a first spike pin attached to a distal end of the body for biting into the track member. At least part of the body may be threaded for screwing into the throughbore of the clamp base. Also, the body may define a threaded recess extending partway into the clamp bolt. The wire bolt may be screwed into the threaded recess of the clamp bolt. The wire bolt defines a longitudinal throughbore for accommodating the wire, cable, or other conductor. When the wire, cable or other conductor is positioned in the wire bolt throughbore the wire bolt holds an electrically conductive end portion of the wire, cable, or other conductor in place.

Another embodiment of the present invention relates to a connection system for electrically connecting a wire, cable, or other conductor to an electrically conductive track member. The connection system may include a clamp base, a clamp bolt, and a wire bolt. The clamp base receives part of an electrically conductive track member, and has a threaded throughbore extending through the clamp base. At least part of the clamp bolt is electrically conductive, and the clamp bolt includes a body and a first spike pin attached to a distal end of the body. At least part of the body is threaded for screwing into the throughbore of the clamp base. Also, one of the clamp base and the body defines a blind threaded recess extending partway into the clamp base or clamp bolt. The wire bolt is threaded for screwing into the blind threaded recess of the clamp base or the clamp bolt. The wire bolt defines a longitudinal throughbore for accommodating the wire, cable, or other conductor. When the wire, cable, or other conductor is positioned through the wire bolt throughbore and the wire bolt is screwed into the blind threaded recess of the clamp base or the clamp bolt, the wire bolt holds an electrically conductive end portion of the wire, cable, or other conductor in place in electrical engagement with a wall of the blind threaded recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member. The clamp base may include an upper clamp portion and a lower clamp portion connected to the upper clamp portion which together at least partly define an opening for receiving the track member part, wherein when the track member part is positioned in the opening, the track member part is disposed between the upper clamp portion and the lower clamp portion. The threaded throughbore of the clamp base may extend through the upper clamp portion. The clamp base may define the blind threaded recess. The recess may extend into the upper clamp portion, the lower clamp portion, or a crossmember of the clamp base connecting the upper clamp portion and the lower clamp portion. Moreover, the recess may be orientated horizontally when the upper clamp portion and/or lower clamp portion are oriented parallel to the ground (but not necessarily parallel to each other, see FIG. 12). The recess may be enclosed by a removable plug to protect the recess from weathering or debris when not in use. The connection system may further include a gripping mechanism disposed between the upper clamp portion and a bolt head of the clamp bolt to maintain a position of the clamp bolt relative to the clamp base.

Yet another embodiment of the present invention relates to a connection system for electrically connecting a wire, cable, or other conductor to an electrically conductive track member. The connection system may include a clamp base, a clamp bolt, and a wire bolt. The clamp base receives part of an electrically conductive track member, and has a threaded throughbore extending through the clamp base. Also, the clamp base has at least one blind threaded recess extending partway into the clamp base. At least part of the clamp bolt is electrically conductive, and the clamp bolt includes a body and a first spike pin attached to a distal end of the body. At least part of the body is threaded for screwing into the throughbore of the clamp base. The wire bolt is threaded for screwing into the blind threaded recess of the clamp base. The wire bolt defines a longitudinal throughbore for accommodating the wire, cable, or other conductor. When the wire, cable, or other conductor is positioned through the wire bolt throughbore and the wire bolt is screwed into the blind threaded recess of the clamp base, the wire bolt holds an electrically conductive end portion of the wire, cable, or other conductor in place in electrical engagement with a wall of the blind threaded recess. When the track member part is received in the clamp base and the clamp bolt is screwed into the threaded throughbore of the clamp base, the first spike pin bites into the track member part. This creates an electrical connection between the track member part and the clamp bolt, and clamps the clamp base in place against the track member. The clamp base may include an upper clamp portion and a lower clamp portion connected to the upper clamp portion, which together at least partly define an opening for receiving the track member part. The track member part may be positioned in the opening and thereby disposed between the upper clamp portion and the lower clamp portion. The threaded throughbore of the clamp base may extend through the upper clamp portion and the at least one blind threaded recess may be a plurality of blind threaded recesses. The plurality of blind threaded recesses extend into one or more of the upper clamp portion, the lower clamp portion or the crossmember of the clamp base connecting the upper clamp portion and the lower clamp portion. In this embodiment, the wire bolt may be a plurality of wire bolts for screwing into the plurality of blind threaded recesses of the clamp base.

An embodiment relates to a connection system comprising a clamp base that defines an opening for receiving part of an electrically conductive railroad track member. When the track member part is positioned in the opening, the track member part is disposed between an upper clamp portion of the clamp base and a lower clamp portion of the clamp base. The clamp base defines an internally threaded throughbore extending through the upper clamp portion. The connection system further comprises an electrically conductive clamp bolt having an upper body portion, an externally threaded lower body portion connected to the upper body portion, and a first spike pin attached to a distal end of the lower body portion. The lower body portion is configured for secure engagement with the throughbore of the clamp base. The upper body portion defines an internally threaded recess extending partway into the clamp bolt. The connection system further comprises a wire bolt having a wire bolt body that is externally threaded for secure engagement with the threaded recess of the clamp bolt. The wire bolt defines a longitudinal throughbore for accommodating a wire, cable, or other conductor. When the wire, cable, or other conductor is positioned through the wire bolt throughbore with an electrically conductive end portion of the wire, cable, or other conductor bent around a distal end of the wire bolt, and the wire bolt is screwed into the threaded recess of the clamp bolt, the distal end of the wire bolt places the end portion of the wire, cable, or other conductor into engagement with a bottom of the clamp bolt recess, for establishing an electrical connection between the wire, cable, or other conductor and the clamp bolt, and for holding the wire, cable, or other conductor in place. When the track member part is positioned in the opening of the clamp base and the clamp bolt is screwed into the threaded throughbore of the clamp base, the first spike pin bites into the track member part for creating an electrical connection between the track member part and the clamp bolt and clamping the clamp base in place against the track member.

In another embodiment of the connection system, the wire bolt further comprises a head attached to a first end of the wire bolt body and an extension attached to a second end of the wire bolt body; the extension defines the distal end of the wire bolt. The extension has a diameter smaller than a diameter of the wire bolt body for establishing a lateral clearance between a side wall of the extension and a side wall of the clamp bolt recess when the wire bolt body is in secure engagement with the clamp bolt recess. The clearance is for accommodating the end portion of the wire, cable, or other conductor bent around the distal end of the wire bolt.

In another embodiment of the connection system, the upper body portion of the clamp bolt comprises a head, and the internally threaded recess extends through the head. The system further comprises a lock nut having internal threads that match the externally threaded clamp bolt lower body portion. When the clamp bolt is screwed into first the lock nut and then the threaded throughbore of the clamp base and tightened into place, with the lock nut positioned between the clamp bolt head and the upper clamp portion of the clamp base, the lock nut helps to maintain the clamp bolt in place.

In another embodiment of the connection system, the system further comprises at least second and third spike pins attached to the lower clamp portion of the clamp base and extending towards the upper clamp portion. The second and third spike pins are each laterally offset from a center axis of the internally threaded throughbore of the clamp base that extends through the upper clamp portion.

In another embodiment of the connection system, the first, second, and third spike pins are made of tungsten, a metal alloy comprising tungsten, or hardened steel.

In another embodiment of the connection system, at least external surfaces of the clamp base, clamp bolt, and wire bolt are galvanized; the external surfaces comprise surfaces of the clamp base, clamp bolt, and wire bolt that are exposed when the wire bolt is screwed into the clamp bolt, and when the clamp bolt, having the wire bolt tightly screwed therein, is screwed into the clamp base.

Another embodiment relates to a connection system installation comprising an electrically conductive railroad track member positioned on a support surface for guiding a rail vehicle along a route. The installation further comprises a clamp base defining an opening, wherein part of the track member is positioned within the opening and disposed between an upper clamp portion of the clamp base and a lower clamp portion of the clamp base. The clamp base defines an internally threaded throughbore extending through the upper clamp portion. The installation further comprises an electrically conductive clamp bolt having an upper body portion and an externally threaded lower body portion connected to the upper body portion. The clamp bolt is tightly screwed into the throughbore of the clamp base. The upper body portion defines an internally threaded recess extending partway into the clamp bolt. The clamp bolt further comprises a first spike pin attached to a distal end of the lower body portion. The first spike pin bites into the track member part and the clamp bolt clamps the clamp base in place against the track member. There is an electrical connection between the track member part and the clamp bolt. The installation further comprises a wire bolt having a wire bolt body that is externally threaded and tightly screwed into the threaded recess of the clamp bolt. The wire bolt defines a longitudinal throughbore, and a wire, cable, or other conductor positioned in the wire bolt throughbore with an electrically conductive end portion of the wire, cable, or other conductor bent around a distal end of the wire bolt. The end portion of the wire, cable, or other conductor is securely sandwiched between the distal end of the wire bolt and a bottom of the clamp bolt recess, for establishing an electrical connection between the wire, cable, or other conductor and the clamp bolt, and for holding the wire, cable, or other conductor in place.

In another embodiment of the connection system installation, the wire bolt further comprises a head attached to a first end of the wire bolt body and an extension attached to a second end of the wire bolt body. The extension defines the distal end of the wire bolt. The extension has a diameter smaller than a diameter of the wire bolt body for establishing a lateral clearance between a side wall of the extension and a side wall of the clamp bolt recess. The end portion of the wire, cable, or other conductor, which is bent around the distal end of the wire bolt, is accommodated within the clearance.

In another embodiment of the connection system installation, the upper body portion of the clamp bolt comprises a head; the internally threaded recess extends through the head. The system further comprises a lock nut having internal threads that match the externally threaded clamp bolt lower body portion. The lock nut is positioned between the clamp bolt head and the upper clamp portion of the clamp base for helping to maintain the clamp bolt in place, with the clamp bolt lower body portion extending through the lock nut.

In another embodiment of the connection system installation, the system further comprises at least second and third spike pins attached to the lower clamp portion of the clamp base and extending towards the upper clamp portion. The second and third spike pins are each laterally offset from a center axis of the internally threaded throughbore of the clamp base that extends through the upper clamp portion. The second and third spike pins bite into a bottom of the track member part for helping to maintain the clamp base in place.

In another embodiment of the connection system installation, the first, second, and third spike pins are made of tungsten, a metal alloy comprising tungsten, and/or hardened steel.

In another embodiment of the connection system installation, at least external, exposed surfaces of the clamp base, clamp bolt, and wire bolt have a protective coating.

Another embodiment relates to a connection system. The connection system comprises a clamp base for receiving part of an electrically conductive track member (the clamp base has a threaded throughbore extending through the clamp base), a clamp bolt, at least part of which is electrically conductive, the clamp bolt having a body and a first spike pin attached to a distal end of the body, at least part of the body being threaded for screwing into the throughbore of the clamp base, wherein the body defines a threaded recess extending partway into the clamp bolt, and a wire bolt that is threaded for screwing into the threaded recess of the clamp bolt. The wire bolt defines a longitudinal throughbore for accommodating a wire, cable, or other conductor. When the wire, cable, or other conductor is positioned through the wire bolt throughbore and the wire bolt is screwed into the threaded recess of the clamp bolt, the wire bolt holds an electrically conductive end portion of the wire, cable, or other conductor in place in electrical engagement with a wall of the clamp bolt recess. When the track member part is received in the clamp base and the clamp bolt is screwed into the threaded throughbore of the clamp base, the first spike pin bites into the track member part for creating an electrical connection between the track member part and the clamp bolt and clamping the clamp base in place against the track member.

In another embodiment of the connection system, the wire bolt comprises a threaded wire bolt body and an extension attached to the wire bolt body. The extension defines a distal end of the wire bolt. The extension has a diameter smaller than a diameter of the wire bolt body for establishing a lateral clearance between a side wall of the extension and a side wall of the clamp bolt recess when the wire bolt is screwed into the clamp bolt recess, the clearance for accommodating the end portion of the wire, cable, or other conductor bent around the distal end of the wire bolt.

In another embodiment of the connection system, the system further comprises a lock nut engaging the clamp bolt for helping to maintain the clamp bolt in place when the clamp bolt is screwed into the throughbore of the clamp base.

In another embodiment of the connection system, the system further comprises at least second and third spike pins attached to the clamp base. The second and third spike pins bite into the track member part, for helping to clamp the clamp base in place against the track member, when the clamp bolt is tightly screwed into the throughbore of the clamp base.

In another embodiment of the connection system, the first, second, and third spike pins are made of tungsten, a metal alloy comprising tungsten, or hardened steel.

Another embodiment relates to a connection system installation. The installation comprises an electrically conductive track member, a clamp base receiving part of the track member, the clamp base having a threaded throughbore extending through the clamp base, a clamp bolt having an at least partially threaded body, at least part of the clamp bolt being electrically conductive, and the clamp bolt being screwed into the throughbore of the clamp base, wherein the body defines a threaded recess extending partway into the clamp bolt, and wherein the clamp bolt further comprises a first spike pin attached to a distal end of the body and biting into the track member part, a threaded wire bolt screwed into the recess of the clamp bolt, wherein the wire bolt defines a longitudinal throughbore, and a wire, cable, or other conductor positioned in the wire bolt throughbore. The wire bolt holds an electrically conductive end portion of the wire, cable, or other conductor in place in electrical engagement with a wall of the clamp bolt recess.

Another embodiment relates to a connection system. The connection system comprises a clamp base for receiving part of an electrically conductive track member, a clamp bolt, and a wire bolt. The clamp base has a threaded throughbore extending through the clamp base. At least part of the clamp bolt is electrically conductive. The clamp bolt has a body and a first spike pin attached to a distal end of the body. At least part of the body is threaded for screwing into the throughbore of the clamp base. One of the clamp base or the clamp bolt body defines a blind threaded recess. The wire bolt is threaded for screwing into the threaded recess of said one of the clamp base or the clamp bolt body. The wire bolt defines a longitudinal throughbore for accommodating a wire, cable, or other conductor. When the wire, cable, or other conductor is positioned through the wire bolt throughbore and the wire bolt is screwed into the threaded recess of said one of the clamp base or the clamp bolt body, the wire bolt holds an electrically conductive end portion of the wire, cable, or other conductor in place in electrical engagement with a wall of the recess. When the track member part is received in the clamp base and the clamp bolt is screwed into the threaded throughbore of the clamp base, the first spike pin bites into the track member part for creating an electrical connection between the track member part and the clamp bolt and clamping the clamp base in place against the track member.

In another embodiment of the connection system, the clamp base comprises an upper clamp portion and a lower clamp portion connected to the upper clamp portion which together at least partly define an opening for receiving the track member part. When the track member part is positioned in the opening, the track member part is disposed between the upper clamp portion and the lower clamp portion. The threaded throughbore of the clamp base extends through the upper clamp portion. The clamp base defines the blind threaded recess, with the recess extending into the upper clamp portion, the lower clamp portion, or a cross-member of the clamp base connecting the upper clamp portion and the lower clamp portion. The recess is orientated horizontally when the upper clamp portion and/or lower clamp portion are oriented parallel to the ground, or may accommodate the shape of the rail base as shown in FIG. 12.

In another embodiment of the connection system, the blind threaded recess includes a plug. The plug is selectively removable from the recess to permit access to the recess for screwing in the wire bolt.

In another embodiment of the connection system, the system further comprises a gripping mechanism disposed between the upper clamp portion and a bolt head of the clamp bolt. When the clamp bolt is screwed into the throughbore of the clamp base the gripping mechanism maintains a position of the clamp bolt relative to the clamp base.

Another embodiment relates to a connection system. The system comprises a clamp base for receiving part of an electrically conductive track member, a clamp bolt, and a wire bolt. The clamp base has a threaded throughbore extending through the clamp base and at least one blind threaded recess formed therein. The clamp bolt, at least part of which is electrically conductive, has a body and a first spike pin attached to a distal end of the body. At least part of the body is threaded for screwing into the throughbore of the clamp base. The wire bolt is threaded for screwing into the at least one blind threaded recess of the clamp base. The wire bolt defines a longitudinal throughbore for accommodating a wire, cable, or other conductor. When the wire, cable, or other conductor is positioned through the wire bolt throughbore and the wire bolt is screwed into the blind threaded recess of the clamp base, the wire bolt holds an electrically conductive end portion of the wire, cable, or other conductor in place in electrical engagement with a wall of the recess. When the track member part is received in the clamp base and the clamp bolt is screwed into the threaded throughbore of the clamp base, the first spike pin bites into the track member part for creating an electrical connection between the track member part and the clamp bolt and clamping the clamp base in place against the track member.

In another embodiment of the connection system, the clamp base comprises an upper clamp portion and a lower clamp portion connected to the upper clamp portion which together at least partly define an opening for receiving the track member part. When the track member part is positioned in the opening, the track member part is disposed between the upper clamp portion and the lower clamp portion. The threaded throughbore of the clamp base extends through the upper clamp portion. The at least one blind threaded recess is a plurality of blind threaded recesses. The plurality of blind threaded recesses respectively extend into one or more of the upper clamp portion, the lower clamp portion or the cross-member of the clamp base connecting the upper clamp portion and the lower clamp portion. The wire bolt is a plurality of wire bolts for screwing into the plurality of blind threaded recesses of the clamp base.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system for electrically connecting a conductor to a track member, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A connection system comprising:
   a clamp base for receiving part of an electrically conductive track member, the clamp base having a threaded throughbore extending through the clamp base;
   a clamp bolt, at least part of which is electrically conductive, the clamp bolt having a body, at least part of the body being threaded for screwing into the throughbore of the clamp base, wherein one of the clamp base or the clamp bolt body defines a blind threaded recess; and
   a wire bolt that is threaded for screwing into the threaded recess of said one of the clamp base or the clamp bolt body, wherein the wire bolt defines a longitudinal throughbore for accommodating a wire, cable, or other conductor;
   wherein when the wire, cable, or other conductor is positioned through the wire bolt throughbore and the wire bolt is screwed into the threaded recess of said one of the clamp base or the clamp bolt body, the wire bolt holds an electrically conductive end portion of the wire, cable, or other conductor in place in electrical engagement with a wall of the recess; and wherein when the track member part is received in the clamp base and the clamp bolt is screwed into the threaded throughbore of the clamp base, the clamp bolt establishes an electrical connection between the track member part and the clamp bolt and clamps the base in place against the track member.

2. The connection system of claim 1 wherein:

the clamp bolt further comprises a first spike pin attached to a distal end of the body; and wherein when the track member part is received in the clamp base and the clamp bolt is screwed into the threaded throughbore of the clamp base, the first spike pin bites into the track member part to establish the electrical connection between the track member part and the clamp bolt.

3. The connection system of claim 1 wherein:

the clamp base defines the blind threaded recess.

4. The connection system of claim 1 wherein:

the clamp bolt defines the blind threaded recess.

5. The connection system of claim 1 wherein:

the clamp base comprises an upper clamp portion and a lower clamp portion connected to the upper clamp portion which together at least partly define an opening for receiving the track member part, wherein when the track member part is positioned in the opening, the track member part is disposed between the upper clamp portion and the lower clamp portion;

the threaded throughbore of the clamp base extends through the upper clamp portion;

the clamp base defines the blind threaded recess, with the recess extending into the upper clamp portion, the lower clamp portion, or a cross-member of the clamp base connecting the upper clamp portion and the lower clamp portion; and the recess is orientated horizontally when the upper clamp portion and/or lower clamp portion are oriented parallel to the ground.

6. The connection system of claim 5 wherein:

the blind threaded recess includes a plug, the plug being selectively removable from the recess to permit access to the recess for screwing in the wire bolt.

7. The connection system of claim 1 further comprising a gripping mechanism disposed between the upper clamp portion and a bolt head of the clamp bolt;

wherein when the clamp bolt is screwed into the throughbore of the clamp base the gripping mechanism maintains a position of the clamp bolt relative to the clamp base.

8. A connection system comprising:

a clamp base defining an opening for receiving part of an electrically conductive railroad track member, wherein when the track member part is positioned in the opening, the track member part is disposed between an upper clamp portion of the clamp base and a lower clamp portion of the clamp base, and wherein the clamp base defines an internally threaded throughbore extending through the upper clamp portion;

an electrically conductive clamp bolt having an upper body portion, an externally threaded lower body portion connected to the upper body portion, and a first spike pin attached to a distal end of the lower body portion, wherein the lower body portion is configured for secure engagement with the throughbore of the clamp base, and wherein the upper body portion defines an internally threaded recess extending partway into the clamp bolt; and a wire bolt having a wire bolt body that is externally threaded for secure engagement with the threaded recess of the clamp bolt, wherein the wire bolt defines a longitudinal throughbore for accommodating a wire, cable, or other conductor;

wherein when the wire, cable, or other conductor is positioned through the wire bolt throughbore with an electrically conductive end portion of the wire, cable, or other conductor bent around a distal end of the wire bolt, and the wire bolt is screwed into the threaded recess of the clamp bolt, the distal end of the wire bolt places the end portion of the wire, cable, or other conductor into engagement with a bottom of the clamp bolt recess, for establishing an electrical connection between the wire, cable, or other conductor and the clamp bolt, and for holding the wire, cable, or other conductor in place; and wherein when the track member part is positioned in the opening of the clamp base and the clamp bolt is screwed into the threaded throughbore of the clamp base, the first spike pin bites into the track member part for creating an electrical connection between the track member part and the clamp bolt and clamping the clamp base in place against the track member.

9. The connection system of claim 8 wherein:

the wire bolt further comprises a head attached to a first end of the wire bolt body and an extension attached to a second end of the wire bolt body, the extension defining the distal end of the wire bolt; and the extension has a diameter smaller than a diameter of the wire bolt body for establishing a lateral clearance between a side wall of the extension and a side wall of the clamp bolt recess when the wire bolt body is in secure engagement with the clamp bolt recess, the clearance for accommodating the end portion of the wire, cable, or other conductor bent around the distal end of the wire bolt.

10. The connection system of claim 8 wherein:

the upper body portion of the clamp bolt comprises a head, the internally threaded recess extending through the head; and the system further comprises a lock nut having internal threads that match the externally threaded clamp bolt lower body portion, wherein when the clamp bolt is screwed into first the lock nut and then the threaded throughbore of the clamp base and tightened into place, with the lock nut positioned between the clamp bolt head and the upper clamp portion of the clamp base, the lock nut helps to maintain the clamp bolt in place.

11. The connection system of claim 8 further comprising at least second and third spike pins attached to the lower clamp portion of the clamp base and extending towards the upper clamp portion, the second and third spike pins each being laterally offset from a center axis of the internally threaded throughbore of the clamp base that extends through the upper clamp portion.

12. The connection system of claim 11 wherein the first, second, and third spike pins are made of one of tungsten, a metal alloy comprising tungsten, or hardened steel.

13. The connection system of claim 8 wherein at least external surfaces of the clamp base, clamp bolt, and wire bolt are galvanized, the external surfaces comprising surfaces of the clamp base, clamp bolt, and wire bolt that are exposed when the wire bolt is screwed into the clamp bolt, and when the clamp bolt, having the wire bolt tightly screwed therein, is screwed into the clamp base.

14. A connection system comprising:
   a clamp base for receiving part of an electrically conductive track member, the clamp base having a threaded throughbore extending through the clamp base and at least one blind threaded recess formed therein;
   a clamp bolt, at least part of which is electrically conductive, the clamp bolt having a body and a first spike pin attached to a distal end of the body, at least part of the body being threaded for screwing into the throughbore of the clamp base; and
   a wire bolt that is threaded for screwing into the at least one blind threaded recess of the clamp base, wherein the wire bolt defines a longitudinal throughbore for accommodating a wire, cable, or other conductor;
   wherein when the wire, cable, or other conductor is positioned through the wire bolt throughbore and the wire bolt is screwed into the blind threaded recess of the clamp base, the wire bolt holds an electrically conductive end portion of the wire, cable, or other conductor in place in electrical engagement with a wall of the recess; and
   wherein when the track member part is received in the clamp base and the clamp bolt is screwed into the threaded throughbore of the clamp base, the first spike pin bites into the track member part for creating an electrical connection between the track member part and the clamp bolt and clamping the clamp base in place against the track member.

15. The connection system of claim 14 wherein:
   the clamp base comprises an upper clamp portion and a lower clamp portion connected to the upper clamp portion which together at least partly define an opening for receiving the track member part, wherein when the track member part is positioned in the opening, the track member part is disposed between the upper clamp portion and the lower clamp portion;
   the threaded throughbore of the clamp base extends through the upper clamp portion; and
   the at least one blind threaded recess is a plurality of blind threaded recesses, the plurality of blind threaded recesses extending into one or more of the upper clamp portion, the lower clamp portion or the cross-member of the clamp base connecting the upper clamp portion and the lower clamp portion; and
   wherein the wire bolt is a plurality of wire bolts for screwing into the plurality of blind threaded recesses of the clamp base.

\* \* \* \* \*

UNITED STATES PATENT AND TRADEMARK OFFICE
CERTIFICATE OF CORRECTION

| | | |
|---|---|---|
| PATENT NO. | : 8,764,461 B2 | Page 1 of 1 |
| APPLICATION NO. | : 13/637266 | |
| DATED | : July 1, 2014 | |
| INVENTOR(S) | : Ballinger | |

It is certified that error appears in the above-identified patent and that said Letters Patent is hereby corrected as shown below:

In the Specification

Column 11, Line 42, delete "clamp base 104" and insert -- clamp base 102 --, therefor.

Column 12, Line 43, delete "threadedly" and insert -- threadedly --, therefor.

Column 12, Line 47, delete "recesses 194" and insert -- recesses 190 --, therefor.

Signed and Sealed this
Twenty-third Day of September, 2014

Michelle K. Lee
*Deputy Director of the United States Patent and Trademark Office*